United States Patent [19]

Suga et al.

[11] 4,449,618
[45] May 22, 1984

[54] LOCK-UP CONTROL SYSTEM FOR LOCK-UP TYPE AUTOMATIC TRANSMISSION

[75] Inventors: Masaaki Suga, Yokohama; Yoshiro Morimoto; Hideo Hamada, both of Yokosuka, all of Japan

[73] Assignee: Nissan Motor Co., Ltd., Yokohama, Japan

[21] Appl. No.: 247,906

[22] Filed: Mar. 26, 1981

[30] Foreign Application Priority Data

Mar. 27, 1980 [JP] Japan .................................. 55-38151
Sep. 26, 1980 [JP] Japan ................................ 55-133007

[51] Int. Cl.$^3$ ............................................ B60K 41/22
[52] U.S. Cl. .................... 192/3.31; 192/3.58; 192/82 T; 192/103 R; 74/866; 74/732
[58] Field of Search ..................... 192/3.28, 3.31, 3.32, 192/3.33, 0.033, 0.076, 0.096, 3.58, 3.57, 82 T, 103 R; 74/645, 866, 731, 732, 733

[56] References Cited

U.S. PATENT DOCUMENTS

| 3,693,478 | 9/1972 | Malloy. | |
| 3,805,640 | 4/1974 | Schneider et al. | 74/645 |
| 3,857,302 | 12/1974 | Morris. | |
| 3,949,847 | 4/1976 | Hoehn | 192/3.3 |
| 3,985,046 | 10/1976 | Morris et al. | |
| 4,208,929 | 6/1980 | Heino et al. | 74/866 X |
| 4,262,335 | 4/1981 | Ahlen | 74/866 X |
| 4,349,088 | 9/1982 | Ito et al. | 192/3.3 |

FOREIGN PATENT DOCUMENTS

| 55-69353 | 5/1980 | Japan. |
| 55-103149 | 8/1980 | Japan. |
| 55-109853 | 8/1980 | Japan. |
| 55-109854 | 8/1980 | Japan. |

Primary Examiner—George H. Krizmanich
Attorney, Agent, or Firm—Schwartz, Jeffery, Schwaab, Mack, Blumenthal & Koch

[57] ABSTRACT

A look-up control system for a lock-up type automatic transmission wherein a torque converter locks up in a pattern when the engine temperature is higher than a predetermined temperature value, but is prevented from locking up in the pattern when the engine temperature is lower than the predetermined temperature value. During engine operation when the engine temperature is lower than the predetermined temperature value, the torque converter is allowed to lock up in a second pattern or prevented from locking up.

13 Claims, 13 Drawing Figures

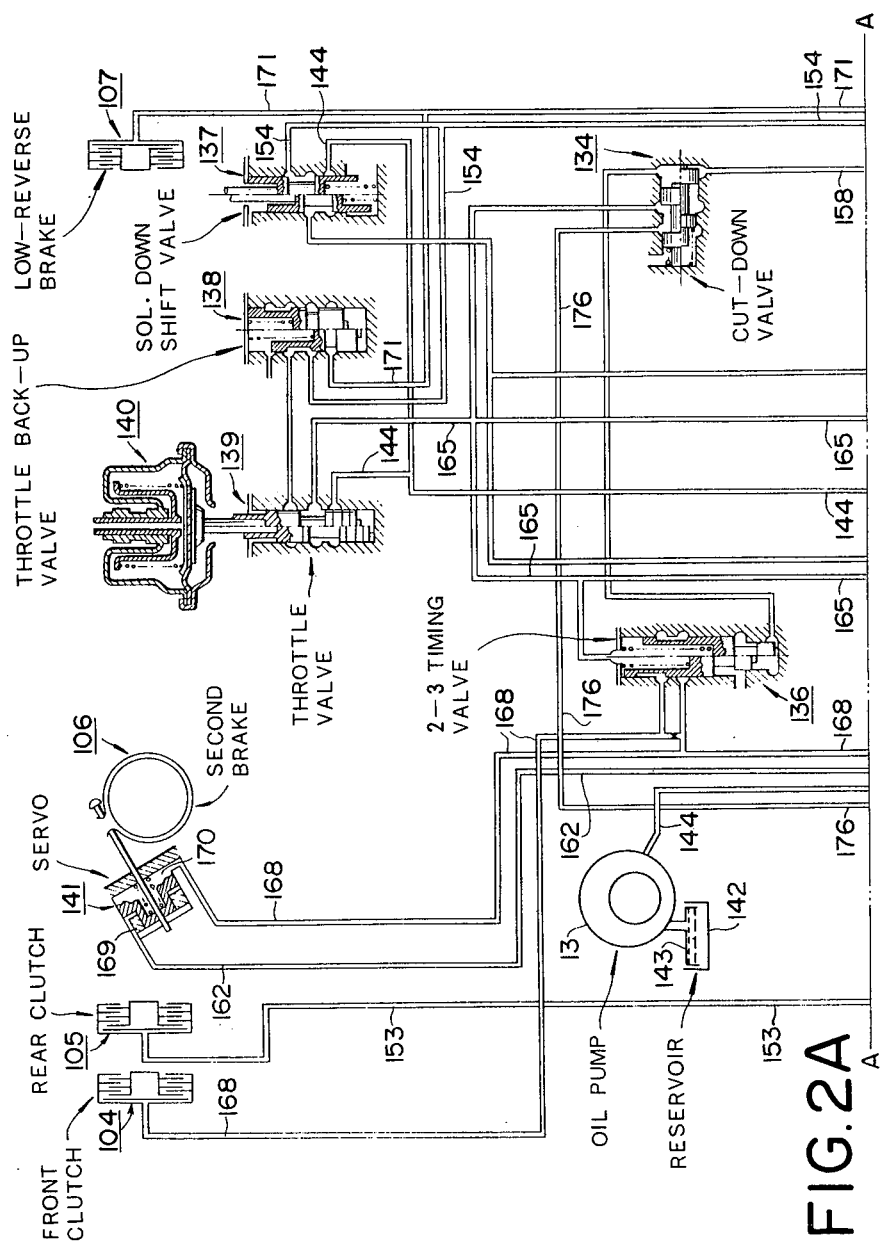

LOCK-UP CONTROL SYSTEM FOR LOCK-UP TYPE AUTOMATIC TRANSMISSION

BACKGROUND OF THE INVENTION

1. Field of the Invention

The present invention relates to a lock-up type automatic transmission and more particularly to a lock-up control system thereof.

2. Description of the Prior Art

Most automatic transmissions include a torque converter in a power transmission system thereof to increase the torque fed to the transmission from an engine. The common torque converters are of the type wherein a pump impeller driven by an engine rotates an operating oil within the torque converter so as to cause the rotation of the operating oil to rotate a turbine runner under the reaction of a stator to increase the torque (torque-converter mode). During the operation of the torque converter, slip between the pump impeller and turbine runner is unavoidable and thus the automatic transmission including such a torque converter in its power transmission system has the advantage of easy operation but a drawback in that the power transmission effeciency is poor and thus the fuel economy is bad. To alleviate this drawback, there has been proposed a so-called torque converter with a direct clutch (also called a lock-up torque converter) wherein during relatively high vehicle speed operation when the torque variation of an engine does not create a problem, the turbine runner is directly connected to the pump impeller (lock-up mode), thereby eliminating slip. Some vehicles use a lock-up type automatic transmission including a torque converter of this kind in the transmission system.

However, with conventional lock-up type automatic transmissions, when in each of the gear ratios the vehicle speed exceeds a predetermined value (lock-up vehicle speed value), the torque converter with the direct clutch is shifted into a lock-up mode, or when the vehicle speed exceeds a predetermined value (lock-up vehicle speed value) in a single predetermined gear ratio, the torque converter with a direct clutch is shifted into a lock-up mode. In both of these cases, the lock-up vehicle speed values are fixed and are constant. Usually, such lock-up vehicle speed values are set to the appropriate values suitable for optimum operation after the warming up of the engine.

However, during engine operation when the warming up operation has not been completed, the combustion within the engine is not stable and thus the engine operation under this mode is equivalent to the engine operation with an excessively large load, so that if the torque converter with a direct clutch is shifted into a lock-up mode when the vehicle speed is above any one of the lock-up vehicle speed values, not only does the driveability worsen due to the shortage of torque, but also the unburnt components within the exhaust gas increases.

Furthermore, even after warming up, engine operation at large load or small load is sacrificed, if as in the conventional case the lock-up vehicle speed value is constant, because the vehicle speed value may not be suitable for engine operation of both high and low load conditions. That is, where the lock-up vehicle speed value is set at a value suitable for the case when the engine load is large, the lock-up vehicle speed value becomes unncessarily high for the case when the engine load is small, thus failing to accomplish an objective of the lock-up type automatic transmission of improving fuel economy. Where the lock-up vehicle speed value is set at a value suitable for the case when the engine load is small, the lock-up vehicle speed value is too low for the case when the engine load is large, worsening the driveability because of the shortage of a torque and at the same time increasing the unburnt components within the exhaust gases.

SUMMARY OF THE INVENTION

According to the present invention, a lock-up control system for a lock-up type automatic transmission comprises a lock-up control valve provided to cause engagement and disengagement of the lock-up clutch, a lock-up solenoid provided to control the shifting of the lock-up control valve, means for providing a lock-up permission signal occurring in a first pattern, said lock-up permission signal providing means being adapted to feed said lock-up permission signal to said lock-up solenoid, and means for preventing the lock-up permission signal from occurring in the first pattern when the temperature of the engine is lower than a predetermined temperature value.

An object of the present invention is to provide a lock-up control system which is free from the above mentioned drawbacks.

More specifically, according to one aspect of the present invention, the first pattern of occurrence of the lock-up permission signal is changed to a second pattern when the temperature of the engine is lower than the predetermined temperature value.

According to another aspect of the present invention, the first pattern of occurrence of the lock-up permission signal is changed to the second pattern of occurrence of the lock-up permission signal when the load on the engine is larger than a predetermined load value even if the temperature of the engine is higher than the predetermined temperature value.

According to still another aspect of the invention, the lock-up permission signal is prevented from being fed to the lock-up solenoid when the temperature of the engine is lower than the predetermined temperature value.

BRIEF DESCRIPTION OF THE DRAWINGS

The invention will be more apparent from the following description and drawings in which:

FIGS. 2A and 2B, when combined, provide a schematic view of a hydraulic control portion of the lock-up type automatic transmission;

DESCRIPTION OF THE PREFERRED EMBODIMENTS

Figure 1:
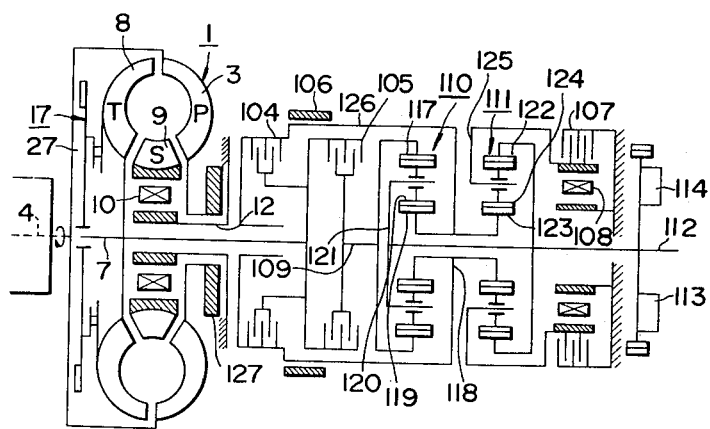
FIG. 1 is a schematic view of a planetary gearing portion of a lock-up type automatic transmission.

Referring to the drawings and particularly to FIG. 1, there is shown a crankshaft 4 driven by a prime mover, such as an engine, a torque converter 1 having a lock-up clutch 17 which will be described later, an input shaft 7, a front clutch 104 (a high-and-reverse clutch), a rear clutch 105 (a forward clutch), a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13. The torque converter 1 comprises a pump impeller 3, a turbine runner 8, and a stator 9, in which the pump impeller 3 is driven by the crankshaft 4 to circulate the torque converter operation oil therein so as to transmit torque to the turbine runner 8 fixed on the input shaft 7. The torque is further transmitted by the input shaft 7 to a change-speed planetary gearing. The stator 9 is disposed on a sleeve 12 through a one-way clutch 10, the one-way clutch allowing the stator 9 to rotate in the same direction as the crankshaft 4, that is, in the direction indicated by an arrow in FIG. 1 (this rotation is referred to as forward rotation hereinafter), but not allowing it to rotate in the reverse direction (this rotation is referred to as reverse rotation hereinafter). The first planetary gear unit 110 comprises an internally toothed gear 117 fixed on the intermediate shaft 109, a sun gear 119 fixed on a hollow transmitting shaft 118, and more than one planetary pinions 120 capable of performing rotation and revolution simultaneously while meshing with the internally toothed gear 117 and sun gear 119 respectively, and a planetary pinion carrier 121 for supporting the planetary pinions 120 fixed on an output shaft 112, wherein the second planetary gear unit 111 comprises an internally toothed gear 122 fixed on the output shaft 112, a sun gear 123 fixed on the hollow transmitting shaft 118, and more than one planetary pinions 124 capable of performing rotation and revolution while meshing with the internally toothed gear 122 and sun gear 123 respectively, and a planetary pinion carrier 125 for supporting the planetary pinions 124. The front clutch 104 is operative to connect the input shaft 7 to be driven by the turbine runner 8 to the hollow transmitting shaft 118 integrally rotatable with both of the sun gears 119 and 123 through a drum 126, whereas the rear clutch 105 is operative to connect the input shaft 7 to the internally toothed gear 117 of the first planetary gear unit 110 through the intermediate shaft 109. The second brake 106 is operative to anchor both sun gears 119 and 123 by braking the drum 126 fixed on the hollow transmitting shaft 118, whereas the low reverse brake 107 is operative to anchor the pinion carrier 125 of the second planetary gear unit 111. The one-way brake 108 allows forward rotation of the pinion carrier 125 but not reverse rotation thereof. The first and second governor valve assemblies 113 and 114 are operatively connected to the output shaft 112 and produce governor pressure in response to the vehicle speed.

Now, power flow paths to be established when a manual speed selector rod is set in D position (forward drive range) will be explained.

In this case, only the rear clutch 105, a forward clutch, is engaged. The power output of the engine via the torque converter 1 is transmitted by the input shaft 7 and rear clutch 105 to the internally toothed gear 117 of the first planetary gear unit 110. This rotation of the internally toothed gear 117 causes the planetary gears 120 to rotate forwardly. Accordingly, the sun gear 119 rotates reversely, and, since the sun gear 123 of the second planetary gear unit 111 which is rotatable with the sun gear 119 rotates reversely, the planetary gears 124 of the second planetary gear unit 111 rotate forwardly. The one-way brake 108 acts as a forward reaction brake to prevent the pinion carrier 125 from being rotated reversely by the sun gear 123, thus causing the forward rotation of the internally toothed gear 122 of the second planetary gear unit 111. Accordingly, the output shaft 112 which is rotatable with the internally toothed gear 122 rotates forwardly, thereby the first forward gear ratio being established.

If, in this state, the vehicle speed increases enough to cause the application of the second brake 106, the power flow path through the input shaft 7 and rear clutch 105 up to the internally toothed gear 117 is the same as that for the first forward speed. The second brake 106 acts as a forward reaction brake to anchor the drum 126 for preventing the rotation of the sun gear 119. This causes the planetary pinions 120 to rotate, revolving simultaneously, around the anchored sun gear 119, and accordingly the planetary pinion carrier 121 and output shaft 112, which is rotatable with the pinion carrier 121, rotate at a faster speed than in the case of the first speed although with a certain reduction ratio, thereby the second forward gear ratio being established.

If the vehicle speed further increases so as to cause the second brake 106 to be released and, in lieu thereof, the front clutch 104 to be engaged, the power on the input shaft 7 is transmitted partially through the rear clutch 105 to the internally toothed gear 117, while the remainder is transmitted through the front clutch 104 to the sun gear 119. Thus, the internally toothed gear 117 and sun gear 119 are interlocked and rotate forwardly, as a unit, together with both the pinion carrier 121 and output shaft 112 at the same rotational speed, thereby the third forward gear ratio being established. In this case, the input is fed to both the front clutch 104 and rear clutch 105 and the torque increase is not carried out by the planetary gears so that none act as a reaction brake in this state.

The planetary gearing arrangement illustrated in and described in connection with FIG. 1 is similar in construction to the planetary gearing arrangement disclosed in U.S. Pat. No. 2,856,794 issued to H. W. Simpson, on Oct. 21, 1958, and reference thereto may be made for a more complete description of the construction and operation of the transmission.

Figure 2B:
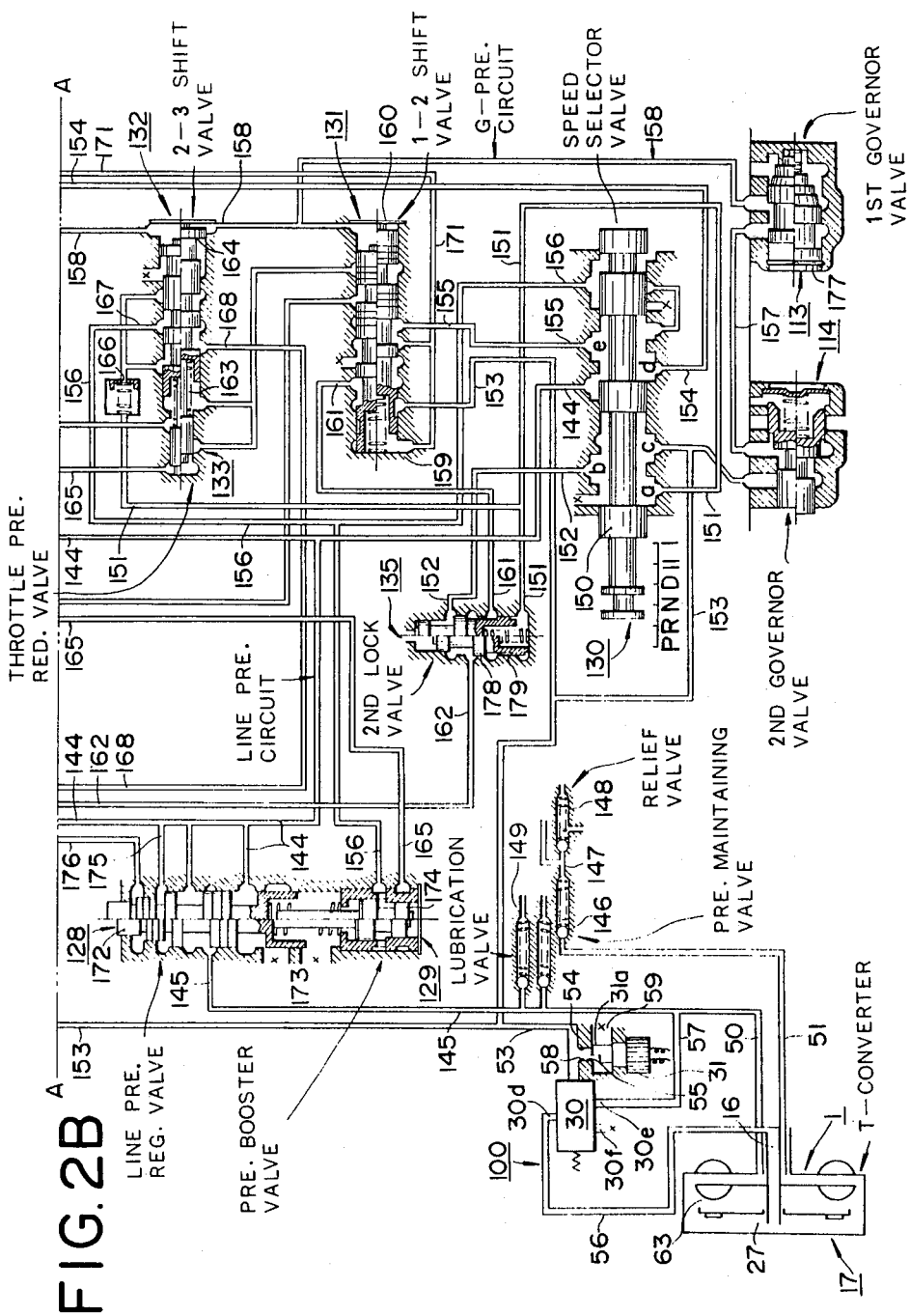

FIGS. 2A and 2B show a hydraulic control system of the above-described change speed transmission. The control system comprises an oil pump 13, a line pressure regulator valve 128, a pressure booster valve 129, a torque converter 1, a speed selector valve 130, a first governor valve 113, a second governor valve 114, a 1-2 shift valve 131, a 2-3 shift valve 132, a throttle pressure reducing valve 133, a cut-down valve 134, a second lock valve 135, a 2-3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and oil pressure circuits. The oil pump 13 is driven by a prime mover through the driving shaft 14 and the pump impeller P of the torque converter 1 for drawing oil from a reservoir 142 through a strainer 143, where harmful dust is removed, during all operating conditions of the prim mover to send the oil to a line pressure circuit 144. The oil is regulated by the line pressure regulator valve 128 and the thus regulated oil is transmitted to the torque converter 1 and speed selector valve 130.

The hydraulic control system illustrated in FIGS. 2A and 2B is similar in construction to the hydraulic control system disclosed in U.S. Pat. No. 3,710,652, issued to T. Miyazaki, on Jan. 16, 1973, and reference may be made for a more complete description of the construction and operation of the transmission.

The line pressure regulator valve 128 comprises a spool 172 and a spring 173, in which, in addition to the spring 173, the throttle pressure in a circuit 165 and the line pressure in a circuit 156 act on the spool 172 via a spool 174 of the pressure booster valve 129 against the line pressure from a circuit 144 through an orifice 175 and the pressure from a circuit 176 both acting on upper areas of the spool 172.

The torque converter operating oil pressure is introduced from the circuit 144 through the line pressure regulating valve 128 to a circuit 145 and, with a pressure maintaining valve 146, the level of this pressure is maintained within a certain range. When the pressure exceeds a certain level, the pressure maintaining valve 146 opens to permit the oil into a circuit 147 toward the rear lubricating part of the power transmitting mechanism. When the lubricating oil pressure is too high, a relief valve 148 opens, resulting in a pressure drop. On the other hand, the lubricating oil is supplied from the circuit 145 through a front lubrication valve 149, as it is open, to the front lubricating part of the power transmitting mechanism. The speed selector valve 130 is a manually operable liquid direction switching valve and it comprises a spool 150, and is connected to a speed selector rod (not shown) through a linkage so that manipulating the speed selector rod into any desired one of the positions causes the spool 150 to change the passage of the line pressure circuit 144. FIG. 2B shows a condition of the speed selector valve when the spool takes up the N (neutral) position, wherein the line pressure circuit 144 is permitted to communicate with two ports d and e.

The first and second governor valves 113 and 114 are operable to produce a governor pressure while the automobile is moving forwardly. When the speed selector valve 130 assumes either D, II or I position, the oil pressure is fed from the line pressure circuit 144 to the second governor valve 114 through the port c of the speed selector valve 130. If under this condition the automobile begins to move, the governor pressure regulated by the second governor valve 114 is supplied to a circuit 157 leading to the first governor valve 113, and subsequently when the vehicle speed reaches a predetermined value, the spool 177 of the first governor valve 113 moves to a position wherein the circuit 157 communicates with a circuit 158, supplying the latter with the governor pressure regulated by the second governor valve 114. The governor pressure is also supplied to the circuit 158, thus acting on the respective end surfaces of the 1-2 shift valve 131, 2-3 shaft valve and cut-down valve 134 against the respective springs which urge these valves toward respective lower half positions illustrated in FIGS. 2A and 2B.

In the oil flow passageway leading from the port c of the speed selector valve 130 through a circuit 153, a circuit 161 and a circuit 162, up to an apply side oil pressure chamber 169, the 1-2 shift valve 131 and second lock valve 35 are separately arranged, and a circuit 152 leads from the port b of the speed selector valve 130 to the second lock-up valve 135.

If the speed selector lever 130 is moved to the D position, the spool 150 of the speed selector valve 130 is moved to a position providing communication between the line pressure circuit 144 and ports a, b and c. From the port a, the oil pressure is transmitted through the circuit 151 to the second lock valve 135 to act on the lower end thereof for preventing the interruption of the circuits 161 and 162 which are permitted to communicate with each other when the spool 178 is pushed down. The spool 178 is urged upwardly by a spring 179 and urged downwardly by the oil pressure transmitted thereto through the circuit 152 from the port b, while, the oil pressure at the port a is transmitted through an orifice 166 and a circuit 167 to the 2-3 shift valve 132. The oil pressure at the port c is transmitted through a circuit 153 to the second governor valve 114, rear clutch 105, and 1-2 shift valve 131, thereby the first forward gear ratio condition of the transmission being provided.

When, under this condition, the vehicle speed increases up to a certain level the governor pressure in the circuit 158 urges the spool 160 to the 1-2 shift valve 131, which is urged to the right by the spring 159, to move to the left, for effecting an upshift from the first forward speed to the second forward speed, and, as a result, the circuit 153 is permitted to communicate with the circuit 161 thereby allowing the oil pressure to be transmitted through the second lock valve 135 to the apply side oil pressure chamber 169 of the servo 141 through a circuit 162 to apply the second brake 106, thus establishing the second forward gear ratio condition.

When the vehicle speed further increases up to another certain level, the governor pressure in the circuit 158 urges the spool 164 of the 2-3 shift valve 132 to the left overcoming the spring 163, so that the circuit 167 is permitted to communicate with the circuit 168 directing the oil pressure, through the circuit 168, to the release-side oil pressure chamber 170 of the servo 141 so as to release the second brake 106 and also to the front clutch 140 to engage the clutch 104, thus the third forward gear ratio condition is established.

If the speed selector lever is moved to the II position, the spool 150 of the speed selector valve 130 is moved to a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162, permitting the oil pressure to reach the apply side oil pressure chamber 169 of the servo 141 so as to effect application of the second brake 106, thereby the second forward gear ratio condition is established. The oil pressure at the port d is transmitted through the circuit 154 to the solenoid down shift valve 137 and throttle back-up valve 138. Since communication between the line pressure circuit 144 leading to the speed selector valve 130 and the port a thereof is prevented, the oil pressure does not get through the circuit 151 to the 2-3 shift valve 132, thus neither release of the second brake 106 nor the application of the front clutch 104 will take place, so that an upshift to the third forward speed is prevented. As explained, the second lock valve 135 cooperates with the speed selector valve 130 to lock the transmission in the second forward speed. If the speed selector lever is moved to I position (the first forward speed fixed), the line pressure circuit 144 is permitted to communicate with the ports c, d and e. The oil pressure at the port c reaches the rear clutch 105 to effect clutch engagement and the oil pressure at the port d reach the same places as in the case of II, whereas the oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby rendering the transmission in the first forward gear ratio condition. The oil pressure at the port e is applied to the left end of the 1-2 shift valve assembly 131, through the circuit 171, urging the spool 160 to the right in cooperation with the spring 159, thereby locking the transmission in the first forward speed once a downshift is made thereto.

In FIG. 2B, the reference numeral 100 denotes a lock-up control system which comprises a lock-up control valve 30 and a lock-up solenoid 31.

Figure 3A:
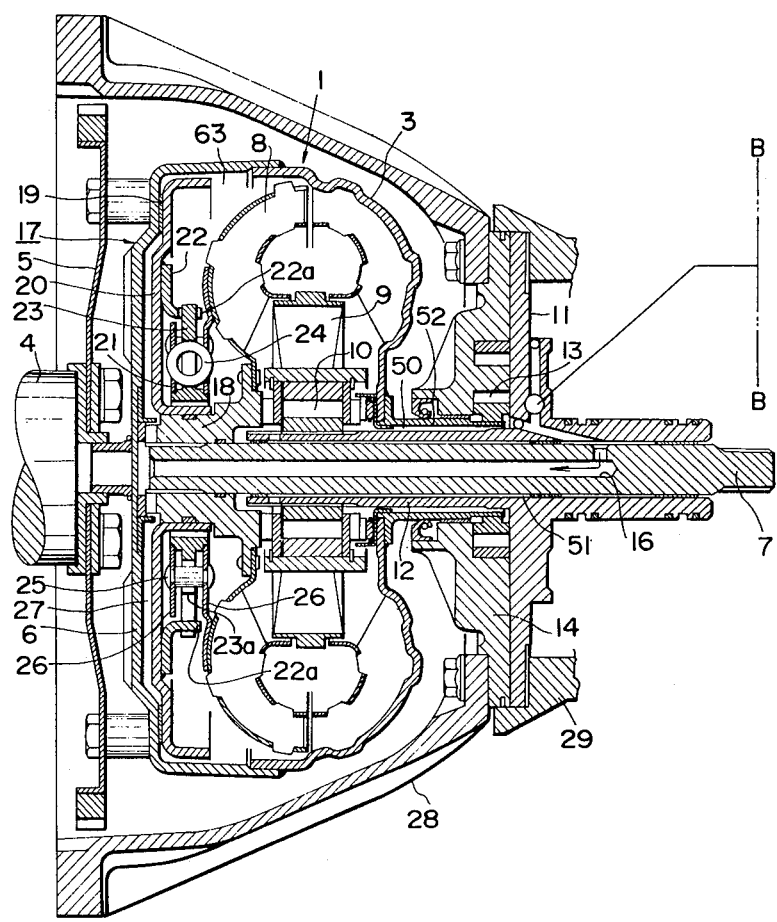
FIGS. 3A and 3B, when combined, provide a schematic sectional view showing the torque converter with a lock-up clutch, lock-up control valve and solenoid value shown in FIG. 2B.
Figure 3B:
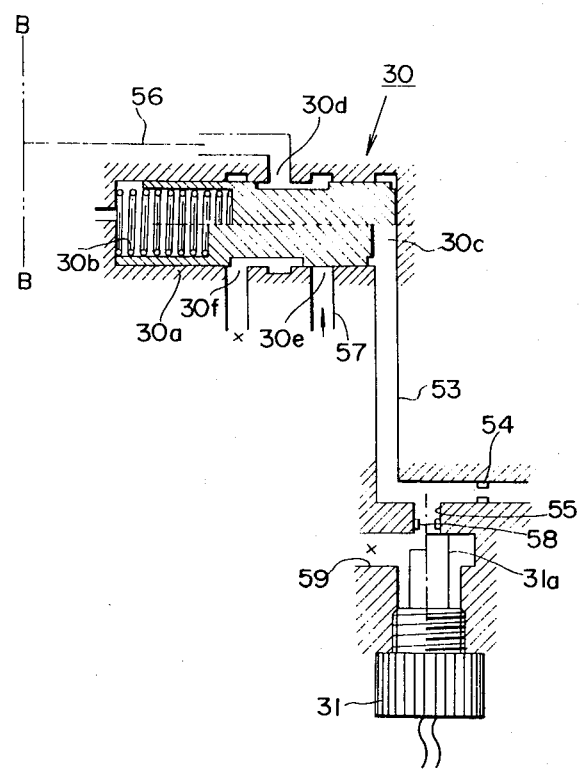

Referring to FIGS. 3A and 3B, the lock-up control valve 30, lock-up solenoid 31 and the torque converter 1 with a lock-up clutch 17 are specifically explained hereinafter.

The pump impeller 3 of the torque converter 1 is connected via a torque converter cover 6 with a drive plate 5, which drive plate is connected to the engine crankshaft 4. The turbine runner 8 is splined to the input shaft 7 with a hub 18, and further the stator 9 is connected to the sleeve 12 via the one-way clutch 10. The torque converter 1 is enclosed by a converter housing 28 which is connected together with a pump housing 14 and a pump cover 11 to a transmission case 29. The pump housing 14 and pump cover 11 cooperate to define a chamber within which the oil pump 13 is accommodated, which pump is connected to the pump impeller 3 through a hollow shaft 52 driven by the engine. The hollow shaft 52 jackets therein the sleeve 12 to define an annular oil feed passage 50, and the sleeve 12 allows the input shaft 7 to extend therethrough and cooperate to define therebetween an oil discharge passage 51. The sleeve 12 is formed integrally with the pump cover 11.

The lock-up clutch 17 has the following structure. A lock-up clutch piston 20 is fit around the hub 18 in an axially slidable manner, and this lock-up clutch piston is accommodated within the converter cover 6. The lock-up clutch piston 20 has an annular clutch facing 19 fixed to a surface thereof positioned opposite to the end wall of the torque converter cover 6, thereby to provide an arrangement wherein when this clutch facing contacts with the end wall of the converter cover 6, a lock-up clutch chamber 27 and a torque converter chamber 63 are defined on the opposite sides of the lock-up clutch piston 20.

The lock-up clutch piston 20 is drivingly connected to the turbine runner 8 via a torsional damper 21. The torsional damper 21 is of the same type as that used in a dry-type clutch and the like and comprises a drive plate 23, torsional springs 24, rivets 25 and driven plates 26. An annular member 22 is welded to the lock-up clutch piston 20 and has its claws 22a drivingly engaging in cutouts 23a formed through the drive plate 23, and the driven plate 26 is attached to the turbine runner 8. The lock-up chamber 27 communicates with a lock-up passage 16 formed through the input shaft 7, which lock-up passage is operatively associated with said lock-up control system 100.

The lock-up control valve 30 is provided with a spool 30a which, when taking the position illustrated in the upper half of FIG. 3B, permits a port 30d to communicate with a port 30e and which, when taking the position illustrated in the lower half of FIG. 3B, permits the port 30d to communicate with a drain port 30f. The port 30d communicates through a passage 56 with the lock-up passage 16, the port 30e communicates through a branch passage 57 with a torque converter operating oil feed passage 50 as shown in FIG. 2B and FIG. 3A. A chamber 30c communicates through a passage 53 with the rear clutch pressure passage 153 as shown in FIG. 2B.

An orifice 54 is provided in the passage 53 at an intermediate portion, and the passage 53 has a branch passage 55 from a location between this orifice and the chamber 30c. The branch passage 55 has therein an orifice 58 and communicates with a drain port 59 and is associated with the lock-up solenoid valve 31 adapted to open and close the branch passage 55. For this purpose, the lock-up solenoid 31 has a plunger 31a which normally takes the position illustrated in the left half position of FIG. 2B or FIG. 3B, but when the lock-up solenoid 31 is energized, projects to assume the position illustrated in the right half portion to close the branch passage 55.

When the lock-up solenoid 31 is not energized to allow the plunger 31a to open the branch passage 55, this branch passage communicates with a drain port 59. Then, the rear clutch pressure in the passage 53, which is directed toward the chamber 30c, is discharged through a drain port 59, thus allowing the lock-up control valve 30 to communicate the port 30d with the port 30e because the spool 30a is urged by a spring 30b to take the position illustrated in the upper half of FIG. 3B. Therefore, a torque converter interior pressure reaching the passage 57 is supplied through the ports 30e, 30d, passage 56, passage 16 to the lock-up chamber 27, thus causing the pressure within the lock-up chamber 27 to have the same pressure valve as that within the converter chamber 63. This causes the lock-up clutch piston 20 to move rightwardly from the illustrated FIG. 3A position to disengage its clutch facing 19 from the end wall of the converter cover 6, thus releasing the direct connection between the pump impeller 3 and the turbine runner 8, allowing the torque converter 1 to transmit the power in the torque converter state.

When the lock-up solenoid 31 is energized to cause the plunger 31a to close the branch passage 55, the rear clutch pressure is supplied through the passage 53 to the chamber 30c, allowing the lock-up control valve 30 to communicate the port 30d with the drain port 30f because the spool 30a is moved leftwardly from the position illustrated in the upper half to the position illustrated in the lower half of FIG. 3B. This causes the lock-up chamber 27 to communicate through the lock-up passage 16, passage 56, port 30d to a drain port 30f, causing the pressure therein to go to zero. Then, the lock-up clutch piston 20 is moved leftwardly as viewed in FIG. 3A by means of the torque converter interior pressure into contact with the end wall of the torque converter cover 6, thus establishing a lock-up state wherein the pump impeller 3 is connected directly to the turbine runner 8.

Figure 4:
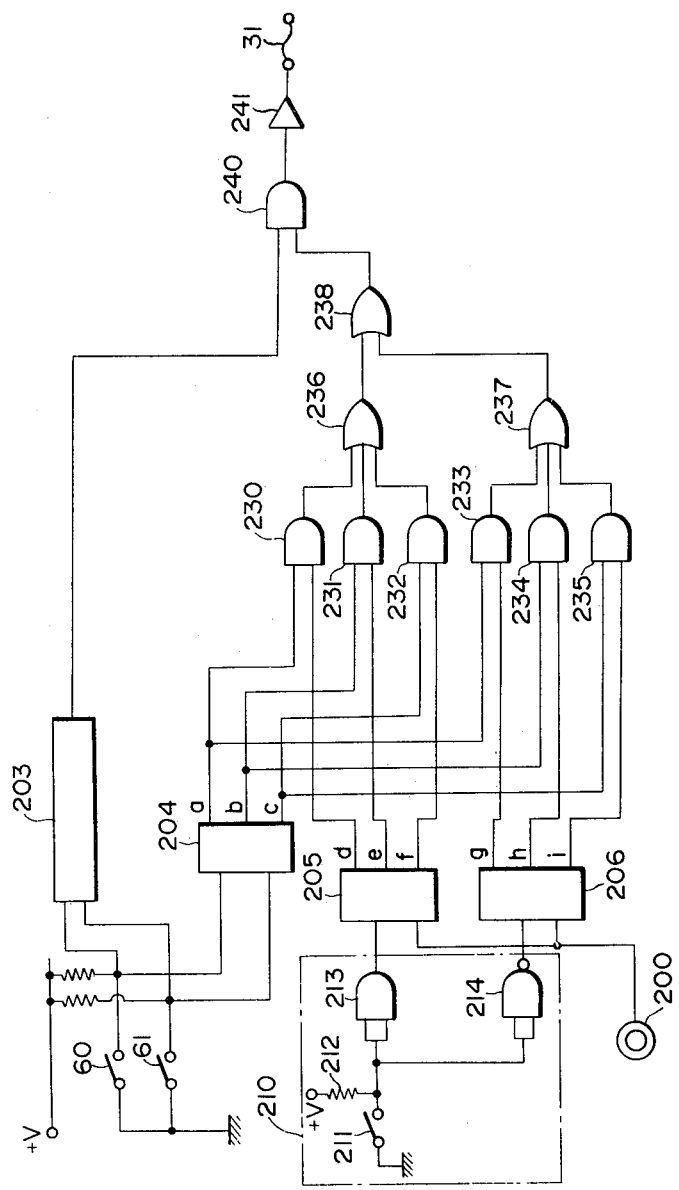
FIG. 4 is a circuit diagram showing a first embodiment of a lock-up control system according to the present invention.

On and off control of, viz., energization and deenergization control of, the above-mentioned lock-up solenoid 31 is controlled by an electronic circuit as shown in FIG. 4. In this Figure, 200 denotes a vehicle speed sensor, 60 denotes a 1-2 shift switch, 61 denotes a 2-3 shift switch, 203 denotes a gear shifting decision circuit which detects the gear shifting operation in the automatic transmission in response to changes in signal from the shift switches 60 and 61, 204 denotes a gear ratio decision circuit which decides which gear ratio is established in the automatic transmission in response to signals from the shift switches 60 and 61, 205 denotes a vehicle speed comparator circuit A, 206 denotes a vehicle speed comparator circuit B, 210 denotes a selector for the vehicle speed comparator circuits, and 211 denotes a temperature sensor which operates in response to for example the engine coolant temperature to detect whether the engine is during warming up or after warming up.

Figure 5:
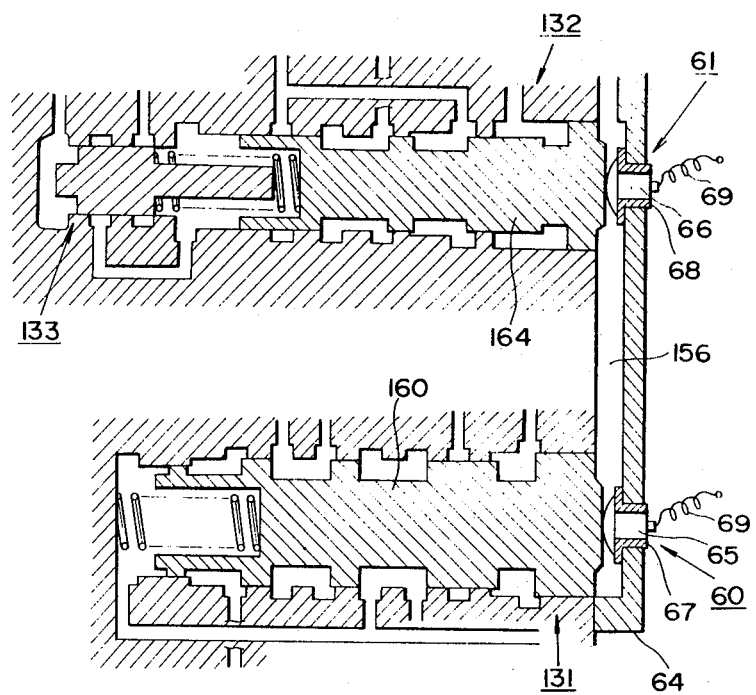
FIG. 5 is a sectional view of the 1-2 shift valve and 2-3 shift valve of the control shown in FIG. 2B showing the structures of shift switches shown in FIG. 4.

The 1-2 shift switch 60 takes the form, for example, of a switch shown in FIG. 5 or a reed switch, which is mounted within the 1-2 shift valve 131 (ref. FIG. 2B) so that it closes when the valve spool 160 is in the position illustrated by the lower half in FIG. 2B (downshift position) and opens when the valve spool 160 is in the illustrated upper half position in FIG. 2 (upshift position). The 2-3 shift switch 61 takes the form, for example, of a switch, such as a reed switch, which is mounted within the 2-3 shift valve 132 so that it closes when the valve spool 164 of the 2-3 shift valve 132 is in the illustrated lower half position in FIG. 2B (downshift position) and it opens when the valve spool 164 is in the illustrated upper half position in FIG. 2 (upshift position). The temperature sensor 211 takes the form of a device which opens when the temperatures are low and correspond to the coolant temperature during the engine warming-up mode and closes when the coolant temperature reaches a predetermined valve after the completion of the engine warming up.

As is apparent from the description in connection with FIGS. 2A and 2B, when the gears are in the first gear ratio, the valve spool 160 of the 1-2 shift valve 131 and the valve spool 164 of the 2-3 shift valve 132 are both in the downshift positions, thus rendering the 1-2 shift switch 60 and the 2-3 shift switch 61 closed. In this instance, both of the shift switches 60 and 61 feed to the gear ratio decision circuit 204 low (L) level signals, and this circuit provides a H level signal at gate a indicating that the transmission in in the first gear ratio. When the second gear ratio is selected, the valve spool 160 of the 1-2 shift valve 131 assumes the upshift position to render the 1-2 shift switch 60 open, but the valve spool 164 of the 2-3 shift valve remains in the down shift position to render the 2-3 shift switch 60 remain closed. In this instance, the 1-2 shift switch 60 can now feed the electric voltage of the power supply circuit +V to the gear ratio decision circuit 204 so that the signal level from the 1-2 shift switch 60 to the gear ratio decision circuit 204 changes to a high (H) level. However, the 2-3 shift switch 61 continues to feed the H level signal to the gear ratio decision circuit 204, and thus this circuit provides a H level signal at gate b when it determines that the transmission is in the second gear ratio in response to the combination of the input signal levels fed thereto. When the third gear ratio is selected, the valve spool 160 of the 1-2 shift valve 131 remains in the upshift position, leaving the 1-2 shift switch 201 open, and the valve spool 164 of the 2-3 shift valve 132 assumes the upshift position, rendering the 2-3 shift valve open. In this instance, none of the shift switches 60 and 61 feed L level signals to the gear ratio decision circuit 204 and this circuit provides H level signal at a gate c when it determines that the transmission is in the third gear ratio in response to the combination of the input signals fed thereto.

The signals mentioned above from the shift switches 60 and 61 are fed to the gear shifting decision circuit 203. The gear shifting decision circuit 203 continues to produce a H level signal during the stable state, viz., when the transmission is not subjected to a gear shifting operation, irrespective of the combination of the signal levels from the shift switches 60 and 61, but provides a L level signal for a predetermined duration of time which corresponds to the duration required for gear shifting operation when either one of the shift switches change its state from close to open or from open to close.

Referring to FIG. 5, preferred embodiments of the 1-2 shift switch 60 and 2-3 shift switch 61 are explained more in detail. As clearly shown in FIG. 5, the 1-2 shift switch 60 and 2-3 shift switch 61 are mounted within the 1-2 shift valve 131 and 2-3 shift valve 132, respectively, in such a manner that they open or close in response to the movements of the corresponding valve spools 160 and 164. Stationary contacts 65 and 66 are mounted at positions opposite to the valve spools 160 and 164, respectively, and these stationary contacts are electrically insulated from the side plate 64 with insulators 67 and 68 and cooperate with the valve spools 160 and 164 which act as movable contacts. Since the shift valves 131 and 132 are grounded to the vehicle body, it is only necessary to connect respective leads 69 from the stationary contacts 65 and 66 to the power supplu circuit +V thus enabling the stationary contact 65 and the valve spool 160 to form the 1-2 shift switch 60 and enabling the stationary contact 66 and the valve spool 164 to form the 2-3 shift switch 61.

As will now be understood from the preceding, when the transmission is in the first gear ratio, both of the valve spools 160 and 162 are in contact with the stationary contacts 65 and 66 as shown in FIG. 5, thus causing the 1-2 shift switch 60 and the 2-3 shift switch 61 to produce low level signals (L). When the transmission is in the second gear ratio, the valve spool 160 only is in a position moved leftwardly to disengage from the stationary contact 65, thus causing the 1-2 shift switch 60 to produce a high level signal (H). When the transmission is in the third gear ratio, the valve spool 164 is also in a position moved leftwardly to disengage from the stationary contact 66, thus causing the 2-3 shift switch 61 to produce the H level signal.

The construction of a preferred embodiment of the gearing shifting decision circuit 203 and of the gear ratio decision circuit 204 are explained later in connection with the embodiment of FIG. 9.

Referring to FIG. 4 again, the temperature sensor 211 is open upon detection of engine warming up operation from the engine coolant temperature, the electric voltage of the source of electricity +V, viz., a H level signal, is fed through a resistor 212 to an AND gate 213 and a NAND gate 214. In this instance, the AND gate 213 feeds a H level signal to the vehicle speed comparator circuit 205 to render same operative and the NAND gate 214 feeds a L level signal to the vehicle speed comparator circuit 206 render it inoperative. On the other hand, when the temperature sensor 211 is closed upon detection of the completion of the engine warming up from the engine coolant temperature, the electric voltage of the power source circuit +V is grounded through the temperature sensor 211, thus allowing the input signals to both the AND gate 213 and NAND gate 214 to change to L levels. In this instance, AND gate 213 provides a L level signal to render the vehicle speed comparator circuit 205 inoperative and the NAND gate 214 provides a H level signal to render the vehicle speed comparator circuit 206 operative. As will now be understood, the vehicle speed comparator circuit selector 210 renders the vehicle speed comparator circuit 205 operative during engine warm up and renders the vehicle speed comparator circuit 206 operative when engine warm up has been completed.

Figure 7:
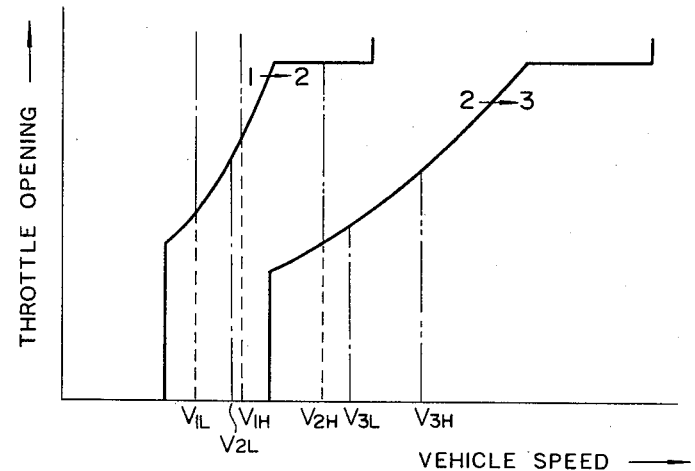
FIG. 7 is a shift pattern diagram used to explain the first and second embodiments.

The vehicle speed comparator circuit 205 memorizes a set of relatively high lock-up vehicle speed values $V_{1H}$, $V_{2H}$ and $V_{3H}$ which are suitable for the first, second and third gear ratios, (ref. FIG. 7) respectively, and compares the vehicle speed signal V fed from the vehicle speed sensor 200 with the lock-up vehicle speed values $V_{1H}$, $V_{2H}$ and $V_{3H}$. The lock-up vehicle speed values $V_{1H}$, $V_{2H}$ and $V_{3H}$ correspond respectively to the low limit values of vehicle speed ranges where the torque shortage does not occur during lock-up mode in the respective gear ratios, and they are set at relatively high values than a set of relatively low lock-up vehicle speed values $V_{1L}$, $V_{2L}$ and $V_{3L}$ in the respective gear ratios (ref. FIG. 7). The vehicle speed comparator circuit 205 provides a H level signal only at a gate d when $V \geq V_{1H}$, provides a H level signal only at a gate e when $V \geq V_{2H}$, and provides a H level signal only at a gate f when $V \geq V_{3H}$ as a result of comparison of the vehicle speed signal V with the above-mentioned lock-up vehicle speed values $V_{1H}$, $V_{2H}$ and $V_{3H}$.

The vehicle speed comparator circuit 206 memorizes above-mentioned relatively low lock-up vehicle speed values $V_{1L}$, $V_{2L}$ and $V_{3L}$ (ref. FIG. 7) which are considered to be appropriate in the respective first, second and third gear ratios after the engine warming-up, and compares the vehicle speed signal V supplied from the vehicle speed sensor 200 with these lock-up vehicle speed values $V_{1L}$, $V_{2L}$ and $V_{3L}$. The vehicle speed comparator circuit 206, as a result of the comparison, produces a H level signal only at a gate g when $V \geq V_{1L}$, provides a H level signal only at a gate h when $V \geq V_{2L}$ and provides a H level signal only at a gate i when $V \geq V_{3L}$.

During the engine warming-up operation, when the vehicle speed signal V exceeds the lock-up vehicle speed value $V_{1H}$ in the first gear ratio, an AND gate 230 performs AND operation between H level signals from the gates a and d to feed a H level signal to an OR gate 236, subsequently causing the OR gate 238 to provide a H level signal, and this signal is supplied to one of the two input terminals of an AND gate 240. Unless the transmission is subjected to gear shifting operation, the gear shifting decision circuit 203 feeds a H level signal to the other of the input terminals of the AND gate 240, so that the AND gate 240 provides a H level signal and this signal is supplied via an amplifier 241 to said lock-up solenoid 31 and the energization of said solenoid causes the torque converter to operate in the lock-up mode.

During the engine warming up operation, when the vehicle speed signal V exceeds the lock-up speed value $V_{2H}$ in the second gear ratio, the AND gate 231 performs AND operation between H level signals from the gates b and e to cause the OR gate 236 to provide a H level signal, thus causing the OR gate 238 to provide a H level signal, and this signal is fed to one of the input terminals of the AND gate 240. Unless the transmission is subjected to the gear shifting operation, the gear shifting decision circuit 203 feeds a H level signal to the other of the two input terminals of the AND gate 240, so that the AND gate 240 provide a H level signal and this signal is supplied through an amplifier 241 to the lock-up solenoid 31 and the energization of the solenoid causes the lock-up mode in the manner described above.

During the engine warming up operation, when the vehicle speed signal V exceeds the lock-up vehicle speed value $V_{3H}$ in the third gear ratio, the AND gate 232 performs AND operation between H level signals from the gates c and f to cause the OR gate 236 to provide a H level signal and then causes the OR gate 238 to provide a H level signal, and this signal is fed to one of the two input terminals of the AND gate 240. Unless the transmission is subject to gear shifting operation, the gear shifting decision circuit 203 feeds a H level signal to the other one of the input terminals of the AND gate 240 so that the AND gate 240 produces a H level signal and this signal is supplied via the amplifier 241 to said lock-up solenoid 31 and the energization of said solenoid causes the lock-up mode in the manner described above.

After the engine warming up, when the vehicle speed V exceeds the lock-up vehicle speed value $V_{1L}$ in the first gear ratio, the AND gate 233 performs AND operation between H level signals from the gates a and g to cause the OR gate 237 to provide a H level signal and then causes the OR gate 237 to provide a H level signal, and this signal is fed to one of the input terminals of the AND gate 240. Unless the transmission is subjected to gear shifting operation, the gear shifting decision circuit 203 feeds a H level signal to the other of the two input terminals of the AND gate 240, so that the AND gate 240 provides a H level signal and this signal is supplied through the amplifier 241 to said lock-up solenoid 31, and the energization of the lock-up solenoid 31 causes the lock-up mode in the manner described above.

After the engine warming up operation, when the vehicle speed signal V exceeds the lock-up vehicle speed value $V_{2L}$ in the second gear ratio, the AND gate 234 performs AND operation between H level signals from the gates b and h to cause the OR gate 237 to provide a H level signal and then causes the OR gate 238 to provide a H level signal, and this signal is fed to one of the two input terminals of the AND gate 240. Unless the transmission is subjected to gear shifting operation, the gear shifting decision circuit 203 feeds a H level signal to the other of the input terminals of the AND gate 240 so that the AND gate 240 provides a H level signal and this signal is supplied through the amplifier 241 to the lock-up solenoid 31, and the energization of the solenoid causes the lock-up mode in the manner described above.

After the engine warming up operation, when the vehicle speed signal V exceeds the lock-up vehicle speed value $V_{3L}$ in the third gear ratio, the AND gate 235 performs AND operation between H level signals from the gates c and i to cause the OR gate 237 to provide a H level signal and then causes the OR gate 238 to provide a H level signal, and this signal is supplied to one of the input terminals of the AND gate 240. Unless the transmission is in gear shifting operation, the gear shifting decision circuit 203 feeds a H level signal to the other of the input terminals of the AND gate 240 so that the AND gate 240 provides a H level signal and this signal is supplied through the amplifier 241 to said lock-up solenoid 31, and the energization of said solenoid causes the lock-up mode as described above.

However, when the engine is operating outside of said lock-up ranges, viz., when the vehicle speed does not reach the lock-up vehicle speed values $V_{1H}$, $V_{2H}$ and $V_{3H}$ in the respective gear ratios during the engine warming up operation and when after the engine warming up operation the vehicle speed does not reach the lock-up vehicle speed values $V_{1L}$, $V_{2L}$ and $V_{3L}$ in the respective gear ratios, none of the AND gates 230 to 235 receive H level signals on the two inputs thereof at the same time so that the lock-up solenoid 31 is kept deenergized, leaving the torque converter in its torque converter mode as described before.

Although, within said lock-up range, the OR gate 238 feeds a H level signal to one of the two input terminals of the AND gate 240, if the transmission is under gear shifting operation, the gear shifting decision circuit 203 detects this event to feed a L level signal to the other of the two input terminals of the AND gate 240, thus releasing said lock-up by denergizing the lock-up solenoid 31. Therefore, the occurrence of shock due to gear shifting with the transmission being in lock-up mode is prevented. After the completion of the gear shifting operation, the gear shifting decision circuit 203 produces a H level signal again, enabling the lock-up control.

As described above, with the lock-up control system according to the present invention, since before engine warm up is completed, a set of relatively high lock-up values are used to effectively utilize the torque increase or multiplication function of the torque converter, the torque shortage problem encountered conventionally has been solved during engine warm up, thus providing enhancement in driveability and purification in exhaust gases. On the other hand, after the engine warming up, the lock-up vehicle speed values are changed and a set of relatively low lock-up vehicle speed values are used, thus enhancing fuel economy by effecting early lock-up without imparting the driveability.

Figure 6:
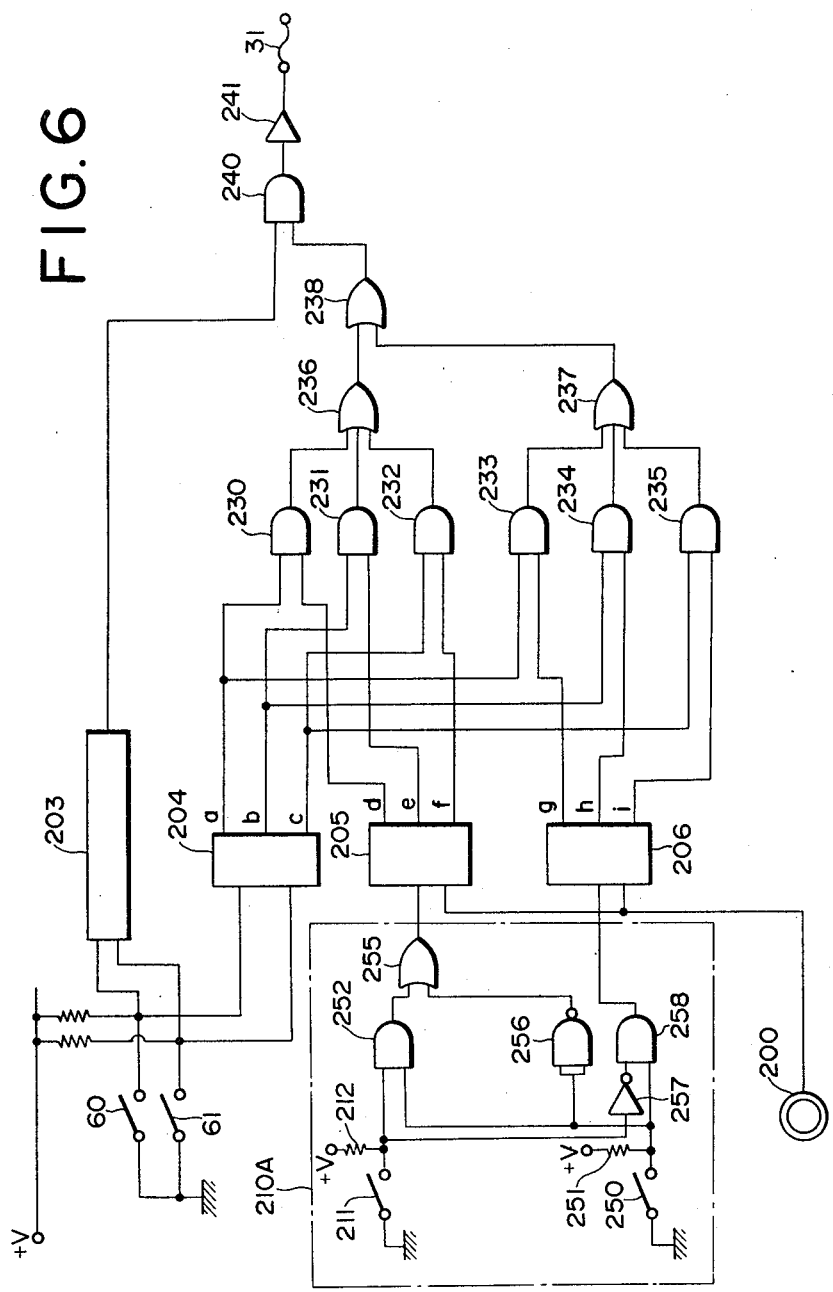
FIG. 6 is a similar view to FIG. 4 showing a second embodiment according to the present invention.

Referring to FIG. 6, another embodiment of a lock-up control system is described, which control system is substantially the same as FIG. 4 embodiment but differs in the following respects. In this embodiment, a vehicle speed comparator selector 210A comprises in addition to the temperature sensor 211 a load sensor 250 so as to incorporate the amount of engine load as a parameter upon deciding which one of the vehicle speed comparator circuits to operative.

The load sensor 250 is in the form of a throttle opening degree responsive switch of the engine, which switch is open during low load engine operation when the throttle opening is below a predetermined value and is closed during high load engine operation when the throttle opening degree is above said predetermined value. Thus, in the event the load sensor 250 is open during low load operation of the engine, the power source circuit +V, viz., a H level signal, is supplied through a resistor 251 to the AND gates 252 and 258 and NAND gate 256, while, in the event the load sensor 250 is closed during high load engine operation, the electric voltage of the power source circuit +V is grounded through the load sensor so that a L level signal is supplied to the AND gates 252 and 258 and NAND gate 256.

In this embodiment, as described before, when the temperature sensor 211 is open upon detecting engine warming up period, a H level signal is fed AND gate 252 and inverter 257. In this instance, when the load sensor 211 is open during low load engine operation, a H level signal is fed to the AND gates 252 and 258. The inverter 257 functions to invert the H level signal to a L level signal and feed same to the AND gate 258, thus preventing this AND gate from producing a H level signal. Therefore only the AND gate 252 is enabled to produce a H level signal. This H level signal causes the OR gate 255 to provide a H level signal and in this instance the vehicle speed comparator circuit 205 is rendered operative. In the event the load sensor 250 is open during low load operation of the engine a H level signal is fed to the AND gate 252 so that the AND gate 252 feeds a H level signal to the OR gate 255, rendering the OR gate 255 to provide a H level signal to render the vehicle speed comparator circuit 205 operative. In the event the load sensor 250 is closed during high load operation of the engine and a L level signal is provided, the NAND gate 256 provides a H level signal to the OR gate 255 so that the vehicle speed comparator circuit 205 is rendered operative. In other words, during engine warming up the vehicle comparator circuit 205 is selected irrespective of the magnitude of engine load, thus accomplishing a similar operation to that accomplished by the embodiment shown in FIG. 4.

When the temperature sensor 211 is closed after the engine warming up to feed a L level signal to an AND gate 252 and inverter 257, the vehicle speed comparator circuits 205 and 206 are selectively rendered operative in response to the engine load as described in the following. That is, in the event that the load sensor 250 is open during low load operation of the engine to provide a H level signal, the AND gate 258 performs AND operation between this H level signal and the H level signal which is obtained as a result of inverting the L level signal from the temperature sensor 211, thus rendering the vehicle speed comparator circuit 206 operative. In the event that the load sensor 250 is closed during high load operation to provide a L level signal, this signal causes the NAND gate 256 to provide a H level signal to feed same to the OR gate 255, thus rendering the vehicle speed comparator circuit 205 operative. In summary, after the warming up operation of the engine, the vehicle speed comparator circuit 206 is selected to operate when the engine load is small so as to lower the lock-up vehicle speed values to effect early stage lock-up for the purpose of trimming fuel consumption to provide good fuel economy, while, on the other hand, when the engine operates with heavy load, the vehicle comparator circuit 205 is selected to provide a set of relatively high lock-up vehicle speed values, thus effectively utilizing the torque increasing function of the torque converter to obtain sufficient power for acceleration.

It will be appreciated that this embodiment features that the lock-up control after warming-up is carried out in response to the engine load.

Although in the previously described embodiments, the torque converter operation mode is extended toward high vehicle side during warming-up of the engine to take full advantage of converter mode operation of the torque converter, the same objective is accomplished by preventing the lock-up clutch from being engaged during warming-up of the engine.

The two embodiments incorporating the above feature are described hereinafter in connection with FIGS. 8 and 9–11.

Figure 8:
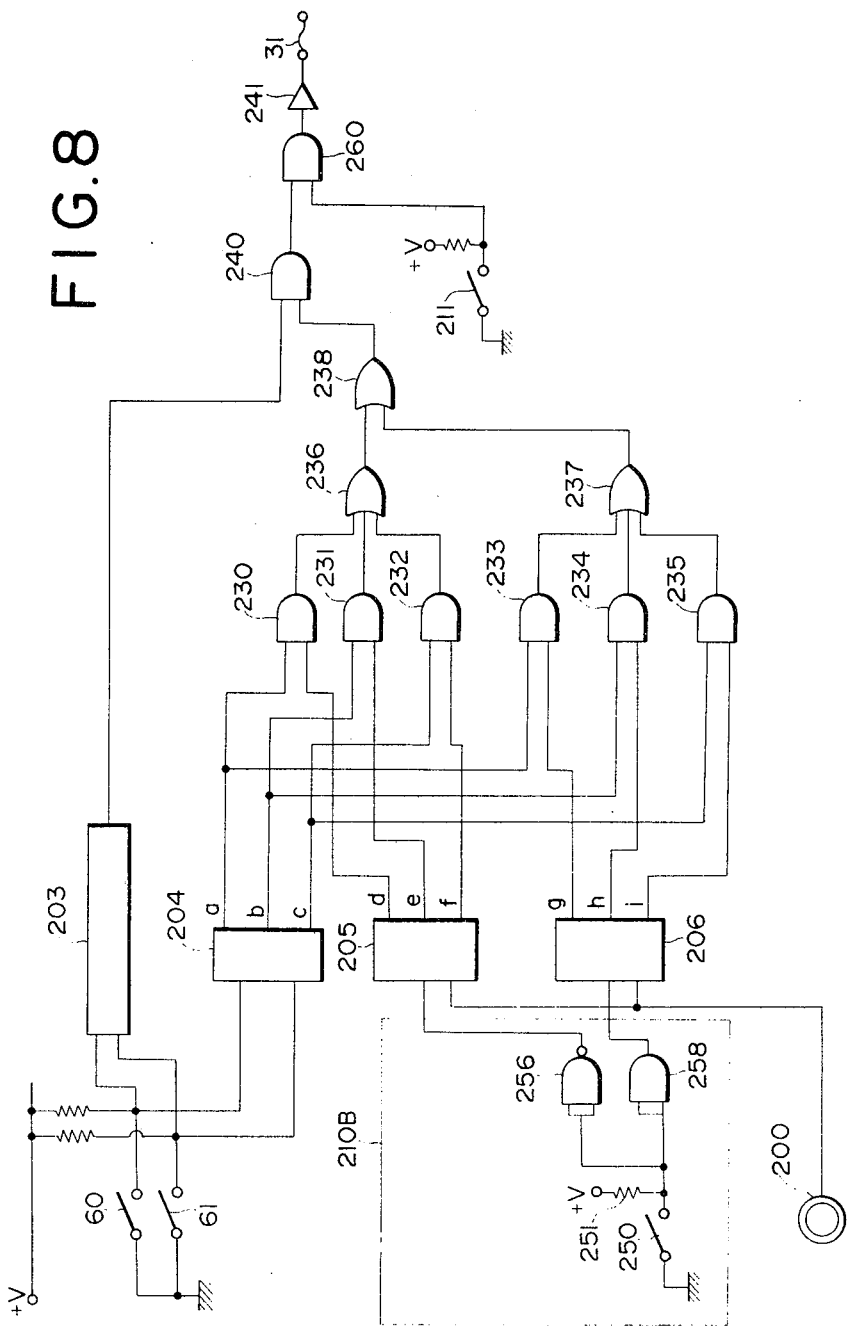
FIG. 8 is a similar view to FIG. 4 showing a third embodiment of the present invention.

Referring to FIG. 8, a third embodiment is described. This embodiment is different from FIG. 6 embodiment in that it includes a vehicle speed comparator selector 210B which decides which one of vehicle speed comparator circuits 205 and 206 to render operative in response to engine load and in that an AND gate 260 is disposed between an AND gate 240 and an amplifier 241 and a temperature sensor 211 is connected to one of the input terminals of the AND gate 260.

When, in operation, the temperature sensor 211 is closed during engine operation after warming up, a H level signal is fed to one input terminals of the AND dates 260, so that a lock-up solenoid is energized whenever a H level signal is provided by an AND gate 240 because the AND gate 260 provides a H level signal when the output of the AND gate 240 is a H level.

During warming-up of the engine, the temperature sensor 211 is open and a L level signal is fed to one of the input terminals of the AND gate 260. Under this condition, the AND gate 260 does not provide a H level signal even if the AND gate 240 provides a H level signal so that the solenoid 31 remains denergized during warming-up of the engine.

Therefore, the torque converter remains in torque converter mode during warming up mode.

Figure 9:
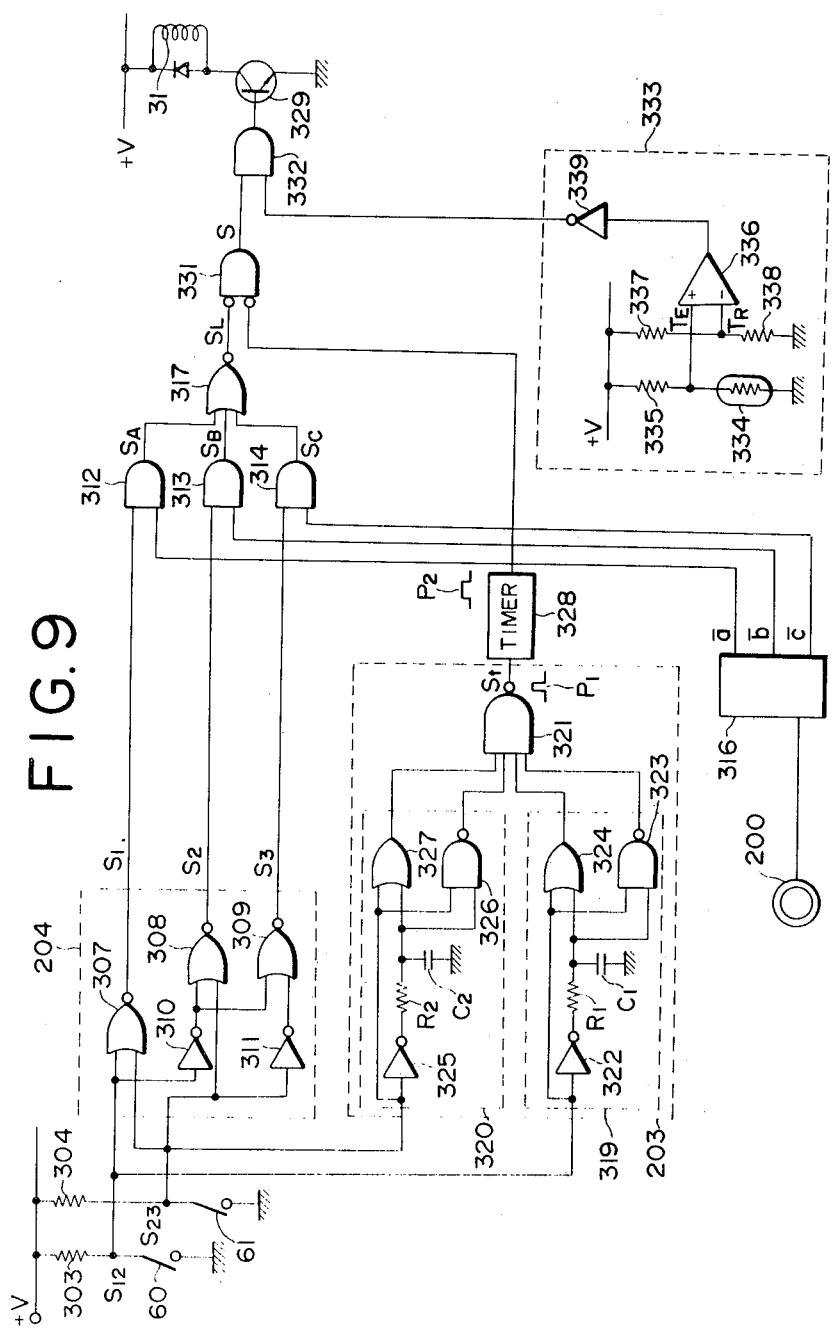
FIG. 9 is a similar view to FIG. 4 showing a forth embodiment of the present invention.

Referring to FIG. 9, a fourth embodiment is shown wherein a 1-2 shift switch 60 and a 2-3 shift switch 61 are used. A summary of the on and off positions of the switches 60 and 61 versus respective gear ratio positions is shown in the following Table 1.

TABLE 1

| switch | gear ratio | | |
|---|---|---|---|
| | 1st gear | 2nd gear | 3rd gear |
| 1-2 shift switch 60 | ON | OFF | OFF |
| 2-3 shift switch 61 | ON | ON | OFF |

Both of the shift switches 60 and 61 are electrically connected to a power source circuit +V through resistors 303 and 304, respectively, so that when these switches 60 and 61 are rendered off, a 1-2 shift signal $S_{12}$ takes a H level and a 2-3 shift signal $S_{23}$ takes a H level, and when the switches 60 and 61 are rendered on, the power source circuit +V is grounded through these switches so that the 1-2 shift signal $S_{12}$ takes a L level and the 2-3 shift signal $S_{23}$ takes a L level. Therefore, the 1-2 shift signal $S_{12}$ and 2-3 shift signal $S_{23}$ versus respective gear are summarized in the following Table 2.

TABLE 2

| shift signal | gear ratio | | |
|---|---|---|---|
| | 1st gear | 2nd gear | 3rd gear |
| 1-2 shift signal $S_{12}$ | L | H | H |
| 2-3 shift signal $S_{23}$ | L | L | H |

The above-mentioned shift signals $S_{12}$, $S_{23}$ are fed to a gear ratio decision circuit 204, respectively, and this circuit decides the gear ratio selected in response to the combination of the both shift signals as shown in Table 2. The gear ratio decision circuit 204 comprises NOR gates 307, 308 and 309 and NOT gates 310 and 311. Under the first gear ratio when the both shift signals $S_{12}$ and $S_{23}$ are rendered L levels, the NOR gate 307 provides a first gear ratio signal $S_1$ having a H level upon reception of these signal. Under the second gear ratio, when only the shift signal $S_{12}$ takes a H level, the NOR gate 308 only provides a second gear ratio signal $S_2$ having a H level, and when the shift signal $S_{23}$ takes a H level too, the NOR gate 309 provides a third gear ratio signal $S_3$ having a H level. The gear ratio decision circuit 204 provides selectively the first gear ratio signal $S_1$, the second gear ratio signal $S_2$ and the third gear ratio signal $S_3$ having H levels from gate 307 corresponding to the first gear ratio condition, gate 308 corresponding to the second gear ratio condition, and gate 309 corresponding to the third gear ratio condition. The signals $S_1$, $S_2$ and $S_3$ are fed to a corresponding input terminal of the AND gates 312, 313 and 314, respectively. The construction of the gear ratio determination circuit 204 of FIGS. 4, 6 and 8 will preferably correspond to the circuit 204 discussed above.

Figure 11:
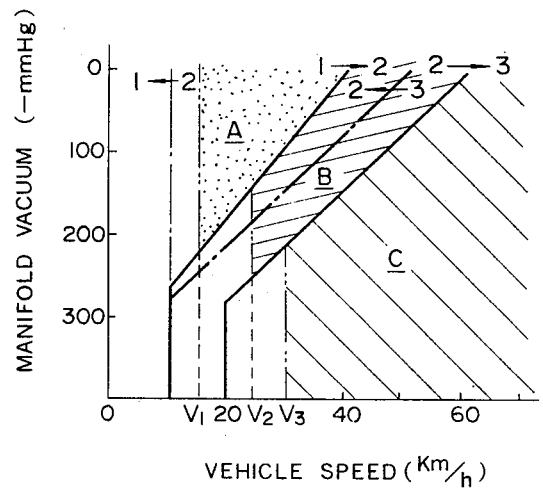
FIG. 11 is a shift pattern diagram used to explain the fourth embodiment.

A vehicle seed sensor 200 provides a vehicle speed signal (voltage) V which increases in accordance with the vehicle speed and feeds this vehicle speed signal V to a vehicle speed comparator circuit 316. The vehicle speed comparator circuit 316 memorizes a lock-up vehicle speed value $V_1$ in the first gear ratio, a lock-up vehicle speed value $V_2$ in the second gear ratio, and a lock-up vehicle speed value $V_3$ in the third gear ratio, and compares the above vehicle speed signal V fed thereto with these lock-up vehicle speed values. The vehicle speed comparator circuit 316 produces a H level signal at a gate $\bar{a}$ when $V \geq V_2$, provides a H level signal also at a gate $\bar{b}$ when $V \geq V_2$, and provide a H level signal also at a gate $\bar{c}$ when $V \geq V_3$, and feed these signals to the remaining input terminals of the AND gates 312 to 314. Therefore, the AND gates 312 to 314 perform AND operations generating outputs using the H level signals fed thereto. The AND gate 312 provides a H level signal $S_A$ when the vehicle is operating in a lock-up speed range A in the first gear ratio as shown in FIG. 11. The AND gate 313 provides H level signal $S_B$ when the vehicle is operating in the lock-up speed range B in the second gear ratio, and the AND gate 314 provides a H level signal $S_C$ when the vehicle is operating in the lock-up speed range C in the third gear ratio shown in FIG. 11. The NOR gate 17 produces a lock-up permission signal $S_L$ of a L level upon reception of signal $S_A$ or $S_B$ or $S_C$ to provide a lock-up permission signal $S_L$ having a L level when the vehicle is operating in one of the ranges A, B and C shown in FIG. 11.

As will be understood, a lock-up permission signal $S_L$ is produced when the vehicle speed (vehicle speed signal V) exceeds in each of the gear ratios (first gear ratio or second gear ratio or third gear ratio) the corresponding lock-up vehicle speed values $V_1$ or $V_2$ or $V_3$.

Returning to FIG. 9, the 1-2 shift signal $S_{12}$ and 2-3 shift signal $S_{23}$ are fed to a gear shifting decision circuit 203 which comprises an edge trigger circuit 319 to detect a rise or a drop in the 1-2 shift signal $S_{12}$, and an edge trigger circuit 320 to detect a rise or a drop in the 2-3 shift signal $S_{23}$, and a NAND gate 321. The edge trigger circuit 319 comprises a NOT gate 322, a resistor $R_1$ and a condensor $C_1$ which make up a delay circuit, a NAND gate 323 for detecting a rise, and an OR gate 324 for detecting a drop. Similarly, the edge trigger circuit 320 comprises a NOT gate 25, a resistor $R_2$ and a condensor $C_2$ which make up a delay circuit, NAND gate 326, and an OR gate 327. The edge trigger circuits 319 and 320 feed negative polarity pulse signals (the pulse width of which is determined by said delay circuits) to the corresponding input terminals of the NAND gate 321 when the corresponding shift signals $S_{12}$ and $S_{23}$ change from L levels to H levels or from H levels to L levels, viz., when a shift is made between gear ratios. In this instance, the NAND gate 321 provides a positive polarity trigger pulse $P_1$ which is obtained by reversing said pulse signal and feed it to a timer circuit 328 as a gear shift signal. With the timer circuit 328, the pulse width of the gear shift signal $S_t$ can be adjusted as desired and provide a pulse signal $P_2$, the pulse width of which can be thus varied in correspondance with the duration time required for gear shifting. The construction of the gear shifing decision circuits 203 of FIGS. 4, 6 and 8 will preferably correspond to the circuit 203 described above.

The terminal 329 denotes a transistor which, when conductive, connects a lock-up solenoid 31 with the power source circuit $+V$. Energization of the lock-up solenoid 31 causes the lock-up torque converter to take a lock-up mode, while, the denergization thereof causes the lock-up torque converter to take a converter mode. To the NAND gate 331 are fed said lock-up permission signal $S_L$ and the pulse signal $P_2$ wherein in the event that the pulse signal $P_2$ is not present representing the stable operation when the gear shifting does not take place in the automatic transmission for the reason stated before and the lock-up permission signal $S_L$ of the L level is present when the vehicle is operating within said lock-up range A or B or C, the NAND gate 331 feeds the lock-up signal S having a H level to one input terminal of the AND gate 332. This lock-up signal causes the AND gate 332, as long as an H level signal is fed to the other input terminal of the AND gate 332, to provide a H level signal to a base of the transistor 329, thereby rendering said transistor conductive, thus energizing the lock-up solenoid 31 to cause the automatic transmission to take the lock-up mode. When the vehicle is operating outside of the lock-up ranges A, B and C and the lock-up permission signal $S_L$ having the L level is not present as described before, the NAND gate 331 upon receiving this event provides the L-level signal, thus preventing the AND gate 332 from producing the H level signal, thus denergizing the transistor 329 to deenergize the lock-up solenoid 31, thus causing the automatic transmission to take a converter mode.

When a shift is being made in the automatic transmission, the pulse shift $P_2$ is produced as is apparent from the above description, the NAND gate 331 provides a L level signal upon receiving this pulse signal, thus preventing the AND gate 332 from producing the H level signal. Thus, even if the lock-up permission signal $S_L$ is present, viz., when the vehicle is operating within the lock-up range A or B or C, this control circuit will operate to deenerize the transistor 329 to deenergize the lock-up solenoid to suspend the lock-up operation for a duration time corresponding to the pulse width of the pulse signal $P_2$ (the duration time for shifting operation of the automatic transmission), thus preventing the occurrence of a shift shock which would occur if the shift is made during the lock-up mode.

Figure 10:
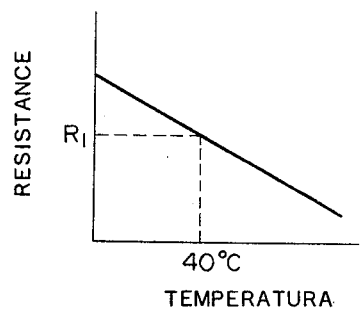
FIG. 10 is a resistance vs. temperature characteristics of a thermistor.

An engine coolant temperature detector circuit 333 is provided. This circuit includes a thermistor 334 as an element to detect the engine coolant temperature. The thermistor 334 is a negative character resistor element which displays a resistance value decreasing as the engine coolant temperature increases as shown in FIG. 10, and is connected through a resistor 335 to the power source circuit $+V$. The junction between the thermistor 334 and the resistor 335 is connected to a plus side input terminal of a comparator 336. Thus the thermistor 334 and the resistor 335 acts as a voltage divider. Thus, the plus side input terminal of the comparator 336 is supplied with a voltage $T_E$ corresponding to the engine coolant temperature (engine coolant temperature signal).

A minus side input terminal of the comparator 336 is connected to a junction between resistors 337 and 338 which are connected in series to form a voltage divider connected to the power source circuit $+V$, wherein the resistance value of the resistor 337 is set the same value as that of the resistor 335 and the resistance value of the resistor 338 is set the same value as the resistance value $R_1$, displayed by the thermistor when the engine coolant temperature is at 40° C., as shown in FIG. 10. Therefore, the minus side input terminal of the comparator 336 is supplied with a reference electric voltage $T_R$ corresponding to the engine coolant temperature of 40° C.

The output terminal of the comparator 336 is connected through a NOT gate 339 to the AND gate 332. With this construction, when the engine coolant temperature is above a predetermined value (40° C. in this case), viz., at high temperatures, the comparator 336 produces a L level signal (temperature signal), and this signal is inverted by the NOT gate 339 into a H level before being fed to the AND gate 332, thus effecting normal lock-up operation as described before. However, when the engine coolant temperature is lower than said predetermined value, viz., at low temperatures, the comparator 336 provides the H level signal and this signal is reversed by the NOT gate 339 into a L level before being fed to the AND gate 332, thus preventing the AND gate 332 from providing the H level signal to deenergize the solenoid 30, thus rendering the automatic transmission to take the normal converter operation mode.

Although the previously embodiments are constructed of electonic circuits elements such as comparators and logic gates, they may be constructed of a microprocessor which can make decision on the signals from the load sensor and temperature sensor and read out values necessary for comparison of the vehicle speed signal with a reference vehicle speed value and put them in a memory (ROM).

What is claimed is:

1. A lock-up type automatic transmission for use with an engine in an automotive vehicle, said lock-up type automatic transmission being shiftable between a plurality of gear ratios including a first gear ratio, a second gear ratio and a third gear ratio and comprising:

a torque converter having a pump impeller adapted to be driven by said engine and a turbine runner;

a lock-up clutch having a clutch piston drivingly connected to said turbine runner, said lock-up clutch being selectively engageable with said pump impeller;

gear ratio determining means operatively connected to said lock-up type automatic transmission for determining which of said plurality of gear ratios said lock-up type automatic transmission is operating in and generating a corresponding gear ratio indicative signal;

vehicle speed sensor means for detecting a vehicle speed of the automotive vehicle and generating a vehicle speed indicative signal;

means, coupled to said gear ratio determining means and to said vehicle speed sensor means, for generating a lock-up signal according to a predetermined pattern, wherein said lock-up signal is generated when said vehicle speed indicative signal is higher than a predetermined first lock-up vehicle speed value under a condition wherein a first gear ratio indicative signal is present or when said vehicle speed indicative signal is higher than a predetermined second lock-up vehicle speed value under a condition wherein a second gear ratio indicative signal is present or when said vehicle speed indicative signal is higher than a predetermined third lock-up vehicle speed value under a condition wherein a third gear ratio indicative signal is present;

control means, coupled to said generating means, for engaging said lock-up clutch in response to said lock-up signal;

temperature sensor means operatively connected to said engine for detecting a temperature of said engine and for generating a low temperature signal when the temperature of said engine is lower than a predetermined temperature value;

means responsive to said low temperature signal for preventing said lock-up signal from being coupled to said control means in said predetermined pattern.

2. The lock-up type automatic transmission of claim 1, wherein said preventing means includes means responsive to said low temperature signal for increasing each of said predetermined first, second and third lock-up vehicle speed values.

3. The lock-up type automatic transmission of claim 1, further including means for detecting a load on said engine and generating a load indicative signal, wherein said preventing means includes means responsive to said low temperature signal and said load indicative signal for increasing said predetermined first, second and third lock-up vehicle speed values.

4. The lock-up type automatic transmission of claim 1, further including means for detecting a load on said engine and generating a load indicative signal and wherein said preventing means includes means responsive to said load indicative signal for increasing said predetermined first, second and third lock-up vehicle speed values, said preventing means further comprising means for preventing transmission of said lock-up signal to said control means, thereby preventing engagement of said lock-up clutch when said low temperature signal is present.

5. The lock-up type automatic transmission of claim 1, wherein said preventing means includes means responsive to said low temperature signal for preventing transmission of said lock-up signal to said control means, thereby preventing engagement of said lock-up clutch when said low temperature signal is present.

6. The lock-up type automatic transmission of claim 1, further comprising means for detecting when said automatic transmission is shifting between any of said plurality of gears and for generating a gear shift signal of predetermined duration whenever gear shifting is detected, and a gate means responsive to said gear shift signal to prevent said lock-up signal from being transmitted to said control means whenever said gear shift signal is present.

7. A lock-up type automatic transmission for use with an engine, said lock-up automatic transmission being shiftable between a plurality of gear ratios including a first gear ratio, a second gear ratio and a third gear ratio and comprising:

a torque converter having a pump impeller adapted to be driven by said engine and a turbine runner;

a lock-up clutch having a clutch piston drivingly connected to said turbine runner and being selectively engageable with said pump impeller;

gear ratio determining means operatively connected with said lock-up type automatic transmission for determining which of said plurality of gear ratios said lock-up type automatic transmission is in and generating a corresponding gear ratio indicative signal;

vehicle speed sensor means for detecting a vehicle speed of the automotive vehicle and generating a vehicle speed indicative signal;

first comparator and gate means coupled to said gear ratio determining means and said vehicle speed sensor means for generating a lock-up signal when said vehicle speed indicative signal is higher than a predetermined relatively high first lock-up vehicle speed value under a condition wherein a first gear ratio indicative signal is present or when said vehicle speed indicative signal is higher than a predetermined relatively high second lock-up vehicle speed value under a condition wherein a second gear ratio indicative signal is present or when said vehicle speed indicative signal is higher than a predetermined relatively high third lock-up vehicle speed value under a condition wherein a third gear ratio indicative signal is present;

second comparator and gate means coupled with said gear ratio determining means and said vehicle speed sensor means for generating a lock-up signal when said vehicle speed indicative signal is higher than a predetermined relatively low first lock-up vehicle speed value under a condition wherein said first gear ratio indicative signal is present or when said vehicle speed indicative signal is higher than a predetermined relatively low second lock-up vehicle speed value under a condition wherein said second gear ratio indicative signal is present or when said vehicle speed indicative signal is higher than a predetermined relatively low third lock-up vehicle speed value under a condition wherein said third gear ratio indicative signal is present, each of said predetermined relatively high lock-up vehicle speed values being higher than a corresponding predetermined relatively low lock-up vehicle speed value;

selector means for detecting an operating condition of said engine and selectively disabling one of said first or second comparator and gate means in response to said detected condition;

control means, coupled to said first and second comparator and gate means for engaging said lock-up clutch in response to said lock-up signal.

8. The lock-up type automatic transmission of claim 1, wherein said selector means includes a temperature sensor means for detecting a temperature of said engine and generating a low temperature signal when the engine temperature is lower than a predetermined temperature value, said selector means being operable to disable said second comparator and gate means in response to the presence of said low temperature signal.

9. The lock-up type automatic transmission of claim 1, wherein said selector means further includes load sensor means for detecting a load on said engine and generating a load indicative signal when the engine load is lower than a predetermined value, said selector means being operable to disable said second comparator and gate means in response to the absence of said load indicative signal.

10. The lock-up type automatic transmission of claim 1, further including temperature sensor means for detecting a temperature of said engine and generating a low temperature signal when the engine temperature is lower than a predetermined temperature value and means for preventing transmission of said lock-up signal to said control means in response to the presence of said low temperature signal.

11. The lock-up type automatic transmission of claim 7, further comprising means for detecting when said automatic transmission is shifting between any of said plurality of gears and for generating a gear shift signal of predetermined duration whenever gear shifting is detected, and a gate means responsive to said gear shift signal to prevent said lock-up signal from being transmitted to said control means whenever said gear shift signal is present.

12. In an automotive vehicle:

an engine;

a lock-up type automatic transmission shiftable between a plurality of gear ratios including a first gear ratio, a second gear ratio and a third gear ratio and including a torque converter having a pump impeller driven by said engine and a turbine runner;

a lock-up clutch having a clutch piston drivingly connected to said turbine runner and being selectively engageable with said pump impeller;

a gear ratio determining means operatively connected to said lock-up type automatic transmission for determining which of said plurality of gear ratios said lock-up type automatic transmission is in and generating a corresponding gear ratio indicative signal;

vehicle speed sensor means for detecting a vehicle speed of the automotive vehicle and generating a vehicle speed indicative signal;

comparator and gate means coupled to said gear ratio determining means and said vehicle speed sensor means for generating a lock-up signal when said vehicle speed indicative signal is higher than a predetermined first lock-up vehicle speed value under a condition wherein a first gear ratio indicative signal is present or when said vehicle speed indicative signal is higher than a predetermined second lock-up vehicle speed value under a condition wherein a second gear ratio indicative signal is present or when said vehicle speed indicative signal is higher than a predetermined third lock-up vehicle speed value under a condition wherein a third gear ratio indicative signal is present;

control means, coupled to said comparator and gate means, for engaging said lock-up clutch in response to said lock-up signal;

means for detecting a temperature of said engine and generating a temperature indicative signal;

means for preventing the transmission of said lock-up signal to said control means in response to said temperature indicative signal.

13. The lock-up type automatic transmission of claim 12, further comprising means for detecting when said automatic transmission is shifting between any of said plurality of gears and for generating a gear shift signal of predetermined duration whenever gear shifting is detected, and a gate means responsive to said gear shift signal to prevent said lock-up signal from being transmitted to said control means whenever said gear shift signal is present.

* * * * *

UNITED STATES PATENT AND TRADEMARK OFFICE
CERTIFICATE OF CORRECTION

PATENT NO. : 4,449,618

DATED : May 22, 1984

INVENTOR(S) : Masaaki SUGA et al.

It is certified that error appears in the above-identified patent and that said Letters Patent is hereby corrected as shown below:

On the cover page, column 1, item 75 (Inventors) should read:

Masaaki Suga, Yokohama; Yoshiro Morimoto; Hideo Hamada; Masaaki Futagi; Tadashi Suzuki, each of Yokosuka, all of Japan Signed and Sealed this Thirtieth Day of October 1984

[SEAL]

Attest:

GERALD J. MOSSINGHOFF

Attesting Officer

Commissioner of Patents and Trademarks